Patented Aug. 24, 1948

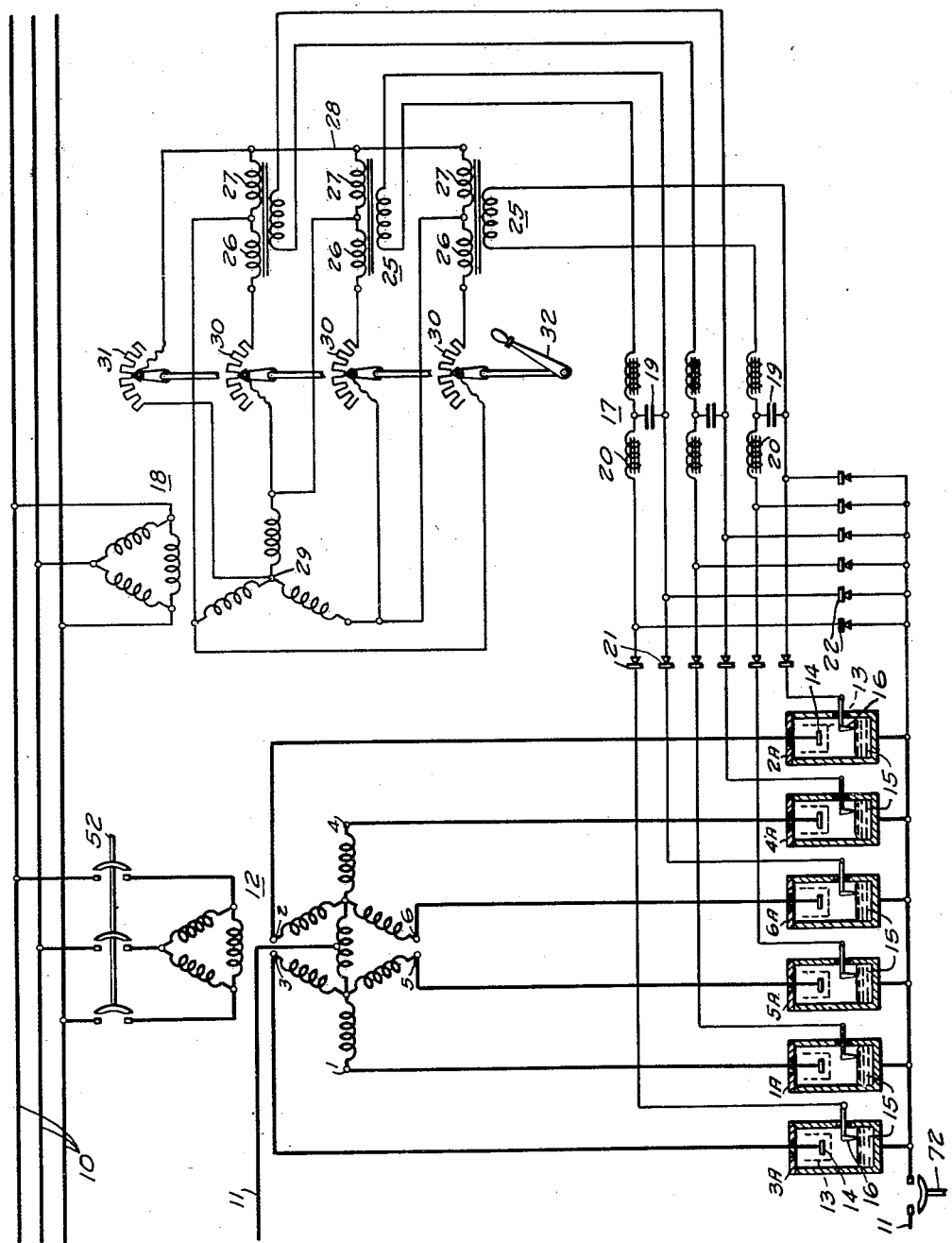

2,447,642

UNITED STATES PATENT OFFICE 2,447,642

PHASE CONTROL SYSTEM FOR VAPOR ELECTRIC CONVERTERS

John P. Ferguson, Berkeley, Calif., assignor to Westinghouse Electric Corporation, East Pittsburgh, Pa., a corporation of Pennsylvania Application May 23, 1944, Serial No. 536,950

7 Claims. (Cl. 323—109)

My invention relates to a vapor-electric device and, particularly, to a phase-shifting transformer for varying the firing instant in a vapor-electric valve.

In the operation of vapor-electric devices, particularly of the make-alive type, it has heretofore been customary to provide phase-shifting networks including reactors, parallel capacitors, and a series variable reactor for shifting the phase of the excitation potential. The components of the phase-shifting networks are relatively large in dimensions and constructed of scarce and expensive materials.

According to my invention, these phase-shifting networks are replaced by means of a second winding in the primary of each of the supply transformers. My system provides a transformer for each of the impulsing networks, each of the transformers having a plurality of primary phase windings. These primary phase windings are connected into two groups, one of the groups being connected in polygon. For instance, in the case of a three-phase system, one group of primaries will be connected in delta. The other group of primary windings will be connected in star. For example, in a three-phase system, one group will be connected in Y. These winding groups provide fluxes 150° apart, and by varying the current in the respective winding groups, the resultant flux may be shifted over an angle of 40 or 50° without distorting the output potential.

According to my invention, I provide resistor means for varying the current between the groups so that a single control device may be utilized for shifting the phase in all of the impulsing networks.

It is, accordingly, an object of my invention to provide a simplified phase-shifting device for controlling the excitation impulses to a vapor-electric device.

It is a further object of my invention to provide a simplified phase-shifting transformer.

It is a further object of my invention to provide a single phase shifting adjustment.

Other objects and advantages of my invention will be apparent from the following detailed description taken in conjunction with the accompanying drawing, in which the single figure is a schematic illustration of a vapor-electric converter embodying my invention.

In the exemplary embodiment of my invention, an alternating-current circuit 10 is connected to a direct-current circuit 11 by means of a converter transformer 12, and the flow of current between the circuits is controlled by a plurality of vapor-electric valves. For purposes of illustration, I have shown six valves 1A to 6A connected to the terminals 1 to 6 of a double three-phase transformer. Preferably the transformer 12 is connected to the alternating-current circuit 10 through a suitable circuit breaker 52, while a protective circuit breaker 72 is provided in the direct-current circuit 11. Each of the valves of the converter comprises a main anode 14, a vaporizable reconstructing cathode 15 of suitable material, such as mercury, and an excitation electrode 16, herein illustrated as of the make-alive type. A grid 13 may be applied if desired.

Excitation impulses are supplied to the excitation electrodes 16 by means of impulsing networks 17, herein illustrated as of the reactor wave distorting type in which a control potential supplied from any suitable source, such as a transformer 18 connected to the alternating-current circuit 10, supplies charging potential to a capacitor 19 which then discharges through a saturable reactor 20 to provide a firing impulse which is supplied to one or the other of a pair of valves 1a—4a, 2a—5a, 3a—6a by means of a polarity selective network, herein illustrated as a unidirectional conductor 21 in series with each of the make-alive electrodes 16 and a second unidirectional conductor 22 in shunt with the first-mentioned unidirectional conductor 21 and the make-alive electrode 16.

As is customary, each of the impulsing networks is provided with current through a single phase transformer 25. I have provided each of these supply transformers 25 with a plurality of primary windings 26 and 27. One of the windings as 26, on each of the single phase transformers 25 is connected into a polyphase polygon-connected group. This polygon-connected group is supplied with potential from the source, herein the terminals of the control transformer 18. The other winding 27 on each of the supply transformers 25 is connected into a star-connected group with the mid-point 28 of the star connected to the mid-point 29 of the control transformer 18.

In order to shift the phase, I have provided resistors 30 in each of the leads of the polygon-connected group and a separate resistor 31 in the star lead of the star-connected group. By varying these resistors, the proportion of current flowing in the separate groups may be controlled, thus shifting the resultant flux in the transformers 25 and the phase of the potential applied to the impulsing network 17. For simplicity, I prefer to provide each of the resistors with a common control element 32 so that as the current is increased in one group, it will be simultaneously decreased in the other group to provide a smooth phase shift without distortion of the terminal potentials applied to the wave distorting networks 17.

While for purposes of illustration I have shown and described a specific embodiment of my invention, it will be apparent that changes and modifications can be made therein without departing from the true spirit of my invention or the scope of the appended claims.

I claim as my invention:

1. In a control system for a converter having a plurality of pairs of alternately conducting valves, and a control circuit for each pair of valves, a phase controller comprising a source of polyphase control potential, a neutral connection in said source of control potential, a coupling transformer between said source of control potential and each of said control circuits, two primary windings on each of said coupling transformers, one primary winding on each coupling transformer being connected in a polygon-connected group to the source of control potential, the other primary winding of each coupling transformer being connected in star to the source of control potential, the star point of said star-connected group being connected to the neutral connection of said source of control potential, and adjustable impedance means for controlling the current flow in each group of primary windings.

2. A control system for an electric current converter, having a plurality of pairs of alternately conducting electric valves and an impulsing circuit for each pair of valves, comprising a polyphase supply circuit having a neutral connection, a substantially independent transformer for each of said impulsing networks, two primary windings for each of said transformers, means for connecting one of said primary windings on each of said transformers to said polyphase source as a star-connected group, means for connecting the others of said primary windings to said source as a polygon-connected group, and means for controlling current flow to each of said groups.

3. In a control system for a vapor electric converter, having a plurality of pairs of electric valves and an impulsing network for each pair of valves, a phase shifter for said impulsing networks comprising a polyphase supply circuit having a neutral connection, a substantially independent transformer for each of said impulsing networks, two primary windings for each of said transformers, means for connecting one of said primary windings on each of said transformers to said polyphase source as a star-connected group, means for connecting the others of said primary windings to said source as a polygon-connected group, and resistance means for varying the division of current flow to each of said groups.

4. A phase shifting network comprising a polyphase supply circuit, a plurality of single-phase load circuits, a star-connected winding energized from said supply circuit, a transformer for each of said load circuits, each of said transformers including a pair of primary windings, one primary winding of each of said transformers being connected in a polygon-connected group, the other primary windings of said transformers being connected in a star-connected group, both of said groups of windings being connected to said star-connected winding, and means for controlling division of current between said winding groups.

5. In a control circuit for a current converting system having a plurality of pairs of alternately conducting valves and an impulsing circuit for each pair of valves, a phase shifter comprising a transformer for each of the impulsing circuits, each of said transformers including a winding connected to an impulsing circuit, a plurality of primary windings, a source of polyphase control potential, circuit means for connecting one primary winding of each transformer to said source in polygon, circuit means for connecting the other of said primary windings of each transformer to said source in star, and means for varying the ratio of current in said primary windings to control the phase angle of the potential supplied to the impulsing circuits.

6. In a control system for a vapor electric converter having a plurality of pairs of alternately conducting valves, a control circuit for each pair of valves, connections including a neutral terminal for supplying polyphase control potential, a coupling transformer between said connections and each of said control circuits, two primary windings on each of said coupling transformers, one primary winding on each coupling transformer being connected in a polygon connected group to the connections for supplying control potential, the other primary winding of each coupling transformer being connected in star to the connections for supplying control potential, the star point of said star-connected group being connected to the neutral terminal of said connections for supplying control potential, and adjustable impedance means for controlling the current flow in each group of primary windings.

7. In a control system for a polyphase converter having a plurality of pairs of alternately conducting valves and an impulsing circuit for each pair of valves, a phase controller for said impulsing circuits comprising a polyphase supply circuit, a star-connected winding energized from said supply circuit, a transformer for each of said impulsing circuits, each of said transformers including a pair of primary windings, one winding of each of said transformers being connected in a polygon-connected group, the other primary windings of said transformers being connected in a star-connected group, both of said groups of windings being connected to said star-connected winding, and means for controlling division of current between said winding groups.

JOHN P. FERGUSON.

REFERENCES CITED

The following references are of record in the file of this patent:

UNITED STATES PATENTS

| Number | Name | Date |
|---|---|---|
| 1,050,081 | Pearson | Jan. 7, 1913 |
| 2,291,092 | Cox et al. | July 28, 1942 |
| 2,318,091 | Myers | May 4, 1943 |